United States Patent

[11] 3,557,803

| [72] | Inventor | Ernest Bosshard<br>1000 Lausanne, Switzerland |
|---|---|---|
| [21] | Appl. No. | 764,894 |
| [22] | Filed | Oct. 3, 1968 |
| [45] | Patented | Jan. 26, 1971 |
| [32] | Priority | Sept. 28, 1967, Apr. 29, 1968 |
| [33] | | Switzerland |
| [31] | | 13572/67 and 6361/68 |

[54] METHOD OF MAKING A CAPILLARY PROSTHESIS
11 Claims, 3 Drawing Figs.

[52] U.S. Cl. .................................................. 132/5,
29/407, 29/428, 132/53, 264/222
[51] Int. Cl. ..................................................... A41g 3/00,
A41g 5/00
[50] Field of Search........................................... 29/407,
445, 428; 132/53, 5; 264/222

[56] References Cited
UNITED STATES PATENTS

| 2,233,100 | 2/1941 | Jevnikar.................... | 132/53 |
| 2,604,104 | 7/1952 | Perlin....................... | 132/53 |
| 2,907,334 | 10/1959 | LeMole..................... | 132/53X |
| 3,077,891 | 2/1963 | Lane.......................... | 132/5 |
| 3,189,035 | 6/1965 | Heck......................... | 132/5 |
| 3,421,521 | 1/1969 | Rich........................... | 132/53X |

FOREIGN PATENTS

| 637,313 | 5/1950 | Great Britain............... | 132/53 |

*Primary Examiner*—Charlie T. Moon
*Attorneys*—Robert E. Burns and Emmanuel J. Lobato

ABSTRACT: A capillary prosthesis or toupee is made by applying on the bald area of the person to be fitted at least one flexible stretched membrane, there is then applied a moldable synthetic resin which can harden on the membrane, the membrane is removed with the resin after the latter has hardened, a skullcap is cut to the desired dimensions, then there are traced on the skullcap the coordinates necessary for positioning the false hair, then there are positioned on the lower side of the skullcap means for securing the prosthesis to the cranium of the person.

PATENTED JAN 26 1971　　　　3,557,803

METHOD OF MAKING A CAPILLARY PROSTHESIS

The present invention has for object a process for making a capillary prosthesis.

Capillary prosthesis have been made heretofore by means of a plaster cast of the part of the cranium intended to receive the prosthesis, moulding from which there was made a skullcap by means of a thermoplastic material or of a furnace-hardened material. Such a process is relatively complicated and does not permit as a result of the shrinking of the material to obtain a skullcap perfectly adapted to the topography of the cranium.

The process according to the invention has just for object to remedy the above-mentioned disadvantages by moulding the material of the skullcap directly on the cranium of the wearer.

This process is characterized in that there is applied on the bald spot of the wearer at least one flexible membrane stretched on a drum the frame of which is secured under pressure to the chin of the wearer, that there is applied a mouldable and hardenable synthetic resin on the membrane, the membrane is removed with the resin after hardening of said resin, the skullcap is cut to the desired dimension, there are traced on the skullcap coordinates necessary for positioning false hair, and then securing means are positioned on the lower side of the skullcap for securing the same to the skull of the subject.

The process of the invention can be used as well for making the frame intended for wig makers for making a wig and for the support of the false hair to be applied on the skull of the wearer.

The accompanying drawing represents by way of example one embodiment of the process according to the invention.

Figure 1:
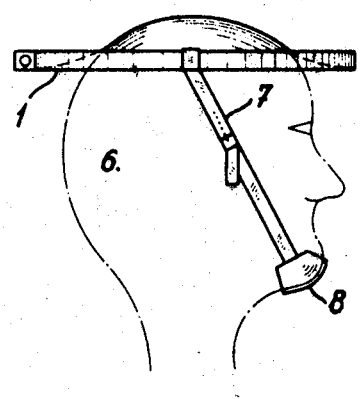
FIG. 1 is a general view showing the device mounted on the head of the wearer.
Figure 2:
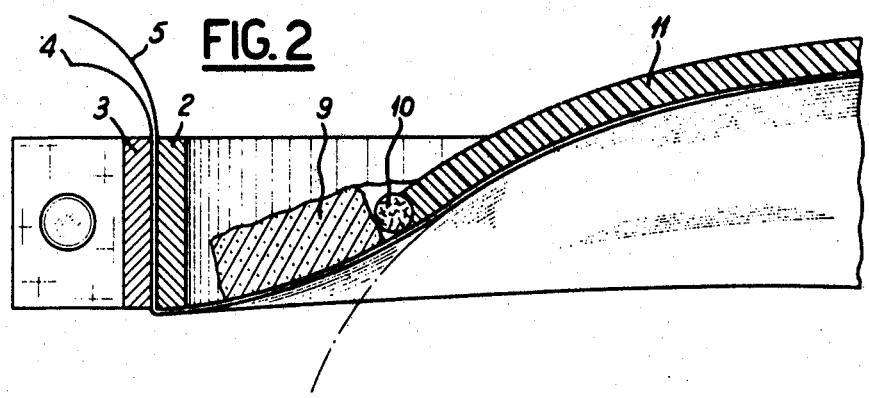
FIG. 2 shows a detail of the device.
Figure 3:
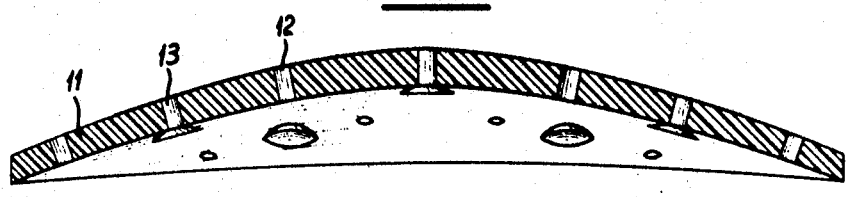
FIG. 3 shows in cross section the finished skullcap.

On an embroidery drum 1 composed of an inner ring 2 and a split tightening ring 3, there is stretched a membrane of cellophane 4 covered by a silk net 5. The drum thus tensioned is applied then on the skull 6 of the wearer and stretched by means of straps 7 fastened on each side of the frame of the drum and connected to a chin piece 8, the whole in such a way that the membrane and the silk net be applied on the part of the skull intended to receive the capillary prosthesis.

It is thus possible to also apply on the said membrane stretched on the skull of the subject and espousing its shape, self-adhesive bands in order to form a sheet on which it is possible to trace the contour of the prosthesis in the coiffure of the hair, then the skullcap is cut and retains its form owing to the self-adhesive bands, the cap thus obtained being sent to the wigmaker for making the wig.

After having traced on the silk the contour of the cap that is desired, there is positioned outside this contour, at about a centimeter therefrom a band of moulding paste or wax 9, then inside the ring formed by the paste, there is positioned a small cord 10.

There is prepared then a synthetic resin which hardens by polymerization, for example a resin known under the name of Palcdur or Formatroy (registered trade mark) to which is added a hardener and possibly a coloring agent. After mixing the resin, the same is put on the silk of the drum as shown at 11. The membrane of cellophane and the silk being flexible, it is possible without further ado to spread the resin in such a way that the same espouses exactly the topography of the bald spot. The spreading, the smoothing and the modelling of the resin 11 can be made with the aid of wet fingers directly on the resin. It is however advantageous to use a second drum similar to the first on which is stretched a silk net and a cellophane membrane, the silk net and the cellophane membrane being disposed inversely to that of drum 1 in such a way that when there is applied the second drum on the resin the silk be in contact with the resin and the modelling and the smoothing take place easily by acting on the cellophane membrane. There would be selected preferably dimensions for the second drum such that the same fits exactly in the first drum and be maintained thereby. It is also possible to provide hooks linking the two drums.

After the resin has hardened, the chin piece 8 is disconnected and drum 1 removed from the head of the wearer. The membrane and the silk are then freed from the drum, and the membrane and the silks of each of the drums respectively, the cord 10 is removed by pulling on one of its free ends, which permits to cut or to rip the membrane and the silk net around the thus obtained resin cap and to remove paste 9. It should be noted that the paste is intended on the one hand to maintain in place the cord 10 which holds the resin and on the other hand retains itself an excessive resin and water used for moulding and smoothing the resin. The resin cap can be placed then in a hermetically closed container, partially filled with water maintained at a temperature of about 30° C. and in which will be introduced compressed air. The assembly is left in this container for about 8 minutes then the resin cap is removed and has a shape which adapts with great precision to the topography of the skull.

There is then removed the cellophane membrane, the silk net remaining naturally stuck to the resin. There is proceeded next to a try of the cap thus obtained on the head of the wearer and then to the positioning of the false hair. There is then traced on the cap the position of the cowl lick and coordinates are drawn which will make possible the correct positioning of the false hair.

The cap is then cut along the first tracing and its edges are thinned and rounded. Vent holes 12 are made through the cap and then closed with wax. In certain of these holes are fixed small rubber suction cups 13 for securing the cap on the skull of the wearer. These suction cups can be secured in different manners, for example by gluing, simple setting or anchoring with steel wire.

After a last try there only remains to secure the false hair on the resin cap and to remove the wax from the vent holes which is done easily by means of the coordinates which are produced on the resin which will be preferably transparent or translucent of the type sold under the registered trade mark name of Aorthorryl.

The cap thus made has therefore at least one silk net on its lower side serving on the one hand to avoid direct contact between the resin and the skin of the wearer and on the other hand to reinforce the cap in the manner of an armature.

Many variations of course are possible with respect to the material used as well as in the means for applying the cap or the several membranes on the skull of the wearer. It is possible for example to use only the cellophane membrane.

Instead of fixing by suction cups, it is possible to provide fastening by a self-adhesive band.

Capillary prosthesis made according to this process adapt with great precision to the skull of the wearer in such a way that the same does not feel any embarrassment as was the case heretofore during the wear of prosthesis obtained by means of thermoplastic material or of furnace-hardened material, the modifications of which change owing to shrinking of the material.

The hermetic container used can be constituted by a cylindrical vat closed by a cover urged on by a tensioning device similar to a pressure cooker.

With respect to the drums they can for example be constituted by an oval frame which is very rigid and surrounded by a circular fitting ring having a screw tensioning device similar to collars used for securing rubber tubes. The inner drum can be maintained within the outer drum, on the one side by a fixed stop overlapping inside the outer drum and on the other side by a lock secured on the outer drum.

I claim:

1. Process for making a capillary prosthesis comprising applying on the bald spot of the intended wearer at least one flexible uniformly stretched membrane, applying a hardenable and mouldable synthetic resin on said membrane, allowing said resin to harden, removing said membrane with said resin, cutting a cap from the thus formed assembly to a desired dimension, tracing on said cap coordinates needed for positioning false hair, positioning and securing false hair on said cap, and then positioning means for securing said prosthesis to the skull of the wearer on the lower side of the cap.

2. Process according to claim 1, wherein there is applied on the bald spot of the wearer a membrane of plastic material coated with a fabric which remains in the resin while the membrane of plastic material is removed from the resin.

3. Process according to claim 2, wherein there is applied a second fabric coated with a membrane of plastic material on the resin for moulding the resin, said second fabric remaining also on the resin.

4. Process according to claim 1, wherein said membrane is stretched on an embroidery drum, the drum being secured under tension to the skin of the wearer.

5. Process according to claim 3, wherein there is traced on the stretched membrane a contour of the cap desired, that the paste is positioned around this tracing, then a cord inside the crown formed by the paste in order to retain resin, while insulating at least partially the resin from the paste.

6. Process according to claim 2, wherein the second fabric and the second membrane are stretched on a frame of the embroidery type.

7. Process according to claim 1, wherein there is applied on the said membrane stretched on the skull of the subject self-adhesive bands in order to form a continuous sheet, and then there is cut a cap intended to form the base for the making of a wig.

8. Process according to claim 1, wherein there is applied on the membrane a pad on which there has previously been stretched an algimate to obtain a negative imprint of the skull, there is moulded with precision plaster in the said negative imprint to obtain a positive reproduction of the skull, this reproduction is applied on a silk stretched on a first drum, there is applied a mouldable and hardenable synthetic resin on the silk, there is applied a flexible stretched membrane on a second drum to crush, distribute and spread the resin to obtain a cap on which can be secured false hair.

9. Process according to claim 2, wherein after hardening of the resin, the silk is cut around the resin and a reproduction in plaster and resin is positioned in a hermetically closed container, partially filled with water at a controlled temperature, and in which is brought compressed air.

10. Process according to claim 3, wherein there is positioned a second silk on the resin stretched with said membrane on the second drum.

11. Process according to claim 3, wherein the same drum is used for taking the imprint and for applying the silk on the plaster.